Nov. 7, 1967   MASAMI TOMONO ET AL   3,351,733

WELDING METHOD

Filed Aug. 21, 1963

3,351,733
WELDING METHOD
Masami Tomono, Hiroshi Ueda, and Hirokazu Kimura, Tokyo, Japan, assignors to Hitachi, Ltd., Tokyo, Japan, a corporation of Japan
Filed Aug. 21, 1963, Ser. No. 303,557
10 Claims. (Cl. 219—117)

This invention relates to a novel welding method.

In the past, when it was desired to connect electrodes with a semiconductor unit, the so-called hot jet process has been used. According to that process, heated hydrogen gas is blown upon a position at which an electrode is desired to be mounted, and a lead wire is fused to the electrode mounting portion by means of a low melting point fusing material. Another method is the resistance welding method which effects fusion by causing an electric current to flow in the lead wire itself and finally, the method wherein the lead wire is thermally compressed upon the electrode mounting portion of a semiconductor.

These methods and processes have usually been conducted by hand operation while viewing the work area through a microscope. The hot jet process is essentially inapplicable when working a small area; and the resistance welding method is disadvantageous in that thermal stress is liable to appear in the finished product, and the method is technically difficult to conduct. The thermocompression bonding method is disadvantageous in that mechanical stresses are liable to be induced and the whole body must be heated.

The method of the present invention uses an electron beam to overcome the disadvantages of the above mentioned electrode mounting methods. According to the invention, a weak electron beam is first projected upon a region of a base to which an electrode material is desired to be welded, moving the electrode material, detecting that the material is under the electron beam by watching the signal change through the electron beam, then increasing the intensity of the electron beam and welding the electrode material to the desired position.

The method of the present invention is conducted through the use of an electron beam, so that the method has the following advantages: (1) welding of a smaller work area than that of prior electrode mounting methods is possible, (2) a strong, solid weld is formed, (3) the temperature profile and the position to which the electrode is to be welded are easily controllable, (4) the character of the weld is controlled in that no thermal stresses are introduced into the unit, since local heating is possible, (5) and further automatic control is possible, if necessary.

Figure 1:
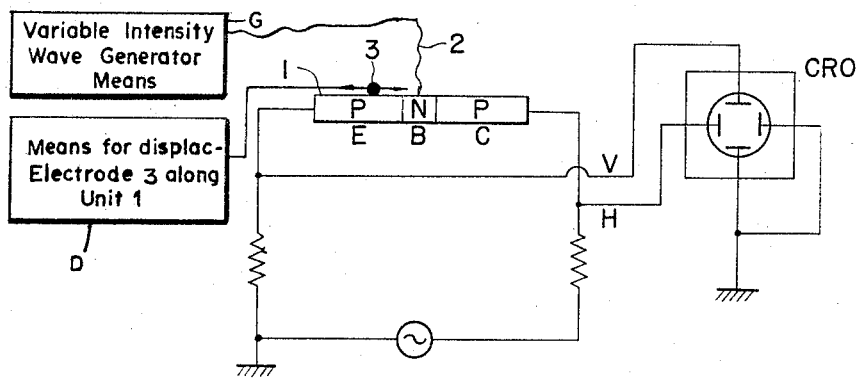
Figure 2A:
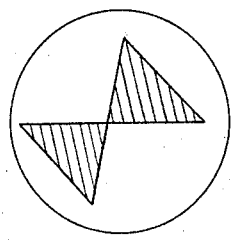
Figure 2B:
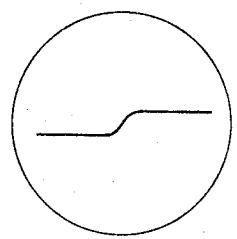
Figure 3:
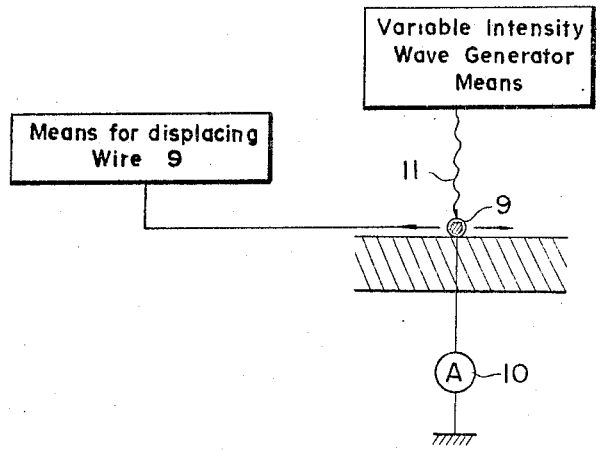

Further objects and advantages, together with a better understanding of the invention may be had by reference to the following description, taken in conjunction with the accompanying drawings, in which:

FIG. 1 is a diagram showing the principle of one embodiment of the invention, FIGS. 2a and 2b are diagrams showing the patterns which appear on cathode ray tube oscilloscope, and FIG. 3 is a diagram showing the principle of still a further embodiment of the invention.

Next, the invention of this application will be described with reference to some preferred embodiments. In the case of a base lead connection of a grown junction type transistor (see FIG. 1), the base region B of a semiconductor unit is scanned with a weak electron beam from a suitable wave generator means G and wherein the beam has been chopped by a frequency in the degree of 1 kc. The electrode material 3 which is to be welded to the base is moved right and left along the unit as indicated by the arrow in FIG. 1 by a suitable displacement means D. Whether the electrode material to be welded is in the base welding region or not, can easily be ascertained by viewing a pattern upon the cathode ray tube oscilloscope (CRO). The pattern of the oscilloscope shown in FIG. 2a shows the pattern when the electrode material is not in the base region and the pattern shown in FIG. 2b shows the pattern when the electrode material is in the base region. When the oscilloscope pattern indicates that the electrode material has reached the electrode connecting region, the beam intensity from the wave generator is increased and welding is effected at the proper temperature profile.

In another embodiment of this invention where an electrode is to be mounted upon any position of a semiconductor bar unit, if a comparatively weak electron beam is projected upon a chosen electrode mounting position, then conductivity modulation will be induced in the semiconductor. The electrode material to be connected is moved along the unit while detecting the conductivity modulation through an outside circuit. When the electrode material comes under the electron beam, the conductivity modulation ceases. After the recognition of this fact, the electrode material is welded by the above method, i.e., the beam intensity is increased.

In another embodiment of this invention where a fine metal wire is used as an electrode material (See FIG. 3), if an ammeter is connected between the fine wire 9 and ground, a current will flow through the ammeter when the fine wire has come under the electron beam 11 and as a result thereof, it is determined that the fine wire is in a welding region. Then, the welding will be carried out by the above mentioned method. In the above mentioned embodiments, electron beams are used but one can use strong light in place of electron beams. In other words, if strong light is used in place of an electron beam 2 and projected upon the semiconductor element, an oscilloscope pattern will be obtained which is the same as in the case of an electron beam.

When a strong light is used in place of an electron beam, there is no need for high vacuum conditions, and an optical lens may be used in conjunction with the light so that another advantage is realized in that the manipulation of the apparatus becomes easy.

While some preferred embodiments of the novel method have been described above in detail, it will be obvious to those skilled in the art that various changes and modifications can be made therein without departing from the invention and, therefore, it is intended in the appended claims to cover all such change and modifications which fall within the true spirit and scope of the invention.

What is claimed:

1. A method of welding a lead wire to a base, said method comprising placing a base under an electromagnetic wave source, projecting a beam of electromagnetic waves from said electromagnetic wave source upon the region of said base to which said lead wire is to be welded, said beam causing a detectable current to flow within said base, moving the lead wire to be welded to the base along the surface of said base in the path of the beam of electromagnetic waves, detecting a change in the current when the lead wire is positioned in the path of the beam, stopping the lead wire in the path of the beam as detected by the change in current, and intensifying the beam of electromagnetic waves to weld the lead wire to the base.

2. The method as claimed in claim 1 wherein the electromagnetic wave is an electron beam.

3. The method as claimed in claim 1 wherein the electromagnetic wave is a light beam.

4. The method as claimed in claim 1 wherein the base comprises semiconductor material.

5. The method as claimed in claim 4 wherein the electromagnetic wave is an electron beam.

6. An apparatus for welding a lead wire to a base with an electromagnetic wave, said apparatus comprising means for generating a beam of electromagnetic waves, means for varying the intensity of said beam of electromagnetic waves, means for directing said beam upon a surface of said base at a desired portion thereof, means for traversing a lead wire across the surface of said base and into the path of the beam, means for detecting an electric signal generated in said base by the projection of said beam upon said base, said lead wire being arrested when in said beam as detected by the detecting means, and then welded to said base by an increase in the intensity of the beam.

7. Apparatus as claimed in claim 6 wherein the electromagnetic wave is an electron beam.

8. Apparatus as claimed in claim 6 wherein the electromagnetic wave is a light beam.

9. Apparatus as claimed in claim 6 wherein the means for detecting the electric signal comprises a cathode ray tube oscilloscope.

10. Apparatus as claimed in claim 6 wherein the means for detecting the electric signal comprises an ammeter.

References Cited

UNITED STATES PATENTS

| | | | |
|---|---|---|---|
| 3,029,348 | 4/1962 | Heinz | 250—220 X |
| 3,148,265 | 9/1964 | Hansen | 219—117 |
| 3,158,733 | 11/1964 | Sibley. | |
| 3,267,250 | 8/1966 | Ullery. | |
| 2,748,349 | 5/1956 | Dickte et al. | 29—25.3 X |

RICHARD M. WOOD, *Primary Examiner.*

B. A. STEIN, *Assistant Examiner.*